United States Patent
Chaudhuri et al.

(10) Patent No.: US 10,566,009 B1
(45) Date of Patent: *Feb. 18, 2020

(54) AUDIO CLASSIFIER

(71) Applicant: Google LLC, Mountain View, CA (US)

(72) Inventors: Sourish Chaudhuri, San Francisco, CA (US); Achal D. Dave, San Diego, CA (US); Bryan Andrew Seybold, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/520,633

(22) Filed: Jul. 24, 2019

Related U.S. Application Data

(63) Continuation of application No. 15/041,379, filed on Feb. 11, 2016, now Pat. No. 10,381,022.
(Continued)

(51) Int. Cl.
*G10L 25/57* (2013.01)
*G06F 16/638* (2019.01)
(Continued)

(52) U.S. Cl.
CPC ............ *G10L 25/57* (2013.01); *G06F 16/638* (2019.01); *G06K 9/00744* (2013.01); *G10L 15/01* (2013.01); *G10L 15/04* (2013.01); *G10L 15/063* (2013.01); *G10L 17/005* (2013.01); *G10L 17/04* (2013.01); *G10L 17/26* (2013.01)

(58) Field of Classification Search
CPC .... G06F 16/48; G06F 16/434; G06F 16/5866; G06F 16/68
See application file for complete search history.

(56) References Cited

U.S. PATENT DOCUMENTS 6,038,527 A 3/2000 Renz
6,490,556 B1 12/2002 Graumann et al.
(Continued)

FOREIGN PATENT DOCUMENTS

EP 3096243 11/2016
WO 2012/129255 9/2012

OTHER PUBLICATIONS

Glasberg et al. "New real-time approchaes for video-genre-classification using high-leval descriptions and a set of classifers," 2008 IEEE International Conference on Semantic Computing, 2008, 8 pages.

*Primary Examiner* — Matthew H Baker
(74) *Attorney, Agent, or Firm* — Fish & Richardson P.C.

(57) ABSTRACT

Methods, systems, and apparatus, including computer programs encoded on a computer storage medium, for audio classifiers. In one aspect, a method includes obtaining a plurality of video frames from a plurality of videos, wherein each of the plurality of video frames is associated with one or more image labels of a plurality of image labels determined based on image recognition; obtaining a plurality of audio segments corresponding to the plurality of video frames, wherein each audio segment has a specified duration relative to the corresponding video frame; and generating an audio classifier trained using the plurality of audio segment and the associated image labels as input, wherein the audio classifier is trained such that the one or more groups of audio segments are determined to be associated with respective one or more audio labels.

18 Claims, 7 Drawing Sheets

Related U.S. Application Data

(60) Provisional application No. 62/387,297, filed on Dec. 23, 2015.

(51) Int. Cl.
  *G10L 17/00* (2013.01)
  *G10L 15/06* (2013.01)
  *G10L 17/04* (2013.01)
  *G10L 17/26* (2013.01)
  *G10L 15/04* (2013.01)
  *G10L 15/01* (2013.01)
  *G06K 9/00* (2006.01)

(56) References Cited

U.S. PATENT DOCUMENTS

| | | |
|---|---|---|
| 6,996,268 B2 | 2/2006 | Megiddo et al. |
| 7,245,767 B2 | 7/2007 | Moreno et al. |
| 7,295,977 B2 | 11/2007 | Whitman et al. |
| 7,336,890 B2 | 2/2008 | Lu et al. |
| 7,337,115 B2 | 2/2008 | Liu et al. |
| 7,472,063 B2 | 12/2008 | Nefian et al. |
| 7,558,809 B2 | 7/2009 | Radhakrishnan et al. |
| 7,590,259 B2 | 9/2009 | Levy et al. |
| 8,103,646 B2 | 1/2012 | Brown |
| 8,392,414 B2 | 3/2013 | Aucouturier et al. |
| 8,452,778 B1 | 5/2013 | Song |
| 8,463,719 B2 | 6/2013 | Lyon et al. |
| 8,566,329 B1 | 10/2013 | Freed |
| 8,682,132 B2 | 3/2014 | Suginohara et al. |
| 8,682,654 B2 | 3/2014 | Chen et al. |
| 8,855,796 B2 | 10/2014 | Otsuka et al. |
| 8,856,051 B1 | 10/2014 | Song et al. |
| 8,938,393 B2 | 1/2015 | Gunatilake |
| 9,075,825 B2 | 7/2015 | Chen |
| 9,098,533 B2 | 8/2015 | Hammontree |
| 9,292,552 B2 | 3/2016 | Arngren |
| 9,824,098 B1 * | 11/2017 | Cox ............... G06Q 30/02 |
| 2003/0154084 A1 | 8/2003 | Li |
| 2005/0125223 A1 | 6/2005 | Divakaran |
| 2006/0149693 A1 | 7/2006 | Otsuka et al. |
| 2008/0040362 A1 | 2/2008 | Aucouturier et al. |
| 2008/0228749 A1 | 9/2008 | Brown |
| 2009/0112864 A1 | 4/2009 | Raichelgauz et al. |
| 2010/0182501 A1 | 7/2010 | Sato et al. |
| 2011/0047163 A1 | 2/2011 | Chechik |
| 2011/0075851 A1 | 3/2011 | LeBoeuf |
| 2012/0039539 A1 | 2/2012 | Boiman et al. |
| 2012/0323925 A1 | 12/2012 | Fitzsimmons |
| 2013/0089304 A1 | 4/2013 | Jiang et al. |
| 2013/0339021 A1 | 12/2013 | Deshmukh |

* cited by examiner

AUDIO CLASSIFIER

CROSS-REFERENCE TO RELATED APPLICATION

This application is a continuation of and claims priority to U.S. application Ser. No. 15/041,379, filed on Feb. 11, 2016 which claims priority to U.S. Provisional Application No. 62/387,297, filed on Dec. 23, 2015. The disclosure of the prior application is considered part of and is incorporated by reference in the disclosure of this application.

BACKGROUND

This specification generally relates to audio classifiers.

Digital audio data (e.g., representing speech, music, or other sounds) can be stored in one or more audio files. The audio files can include files with only audio content (e.g., music files) as well as audio files that are associated with, or part of, other files containing other content (e.g., video files with one or more audio tracks). The audio data can include speech and music as well as other categories of sound including natural sounds (e.g., rain, wind), human emotions (e.g., screams, laughter), animal vocalization (e.g., lion roar, purring cats), or other sounds (e.g., explosions, racing cars, ringing telephone).

It can be useful to classify audio data as being associated with a particular label. One conventional technique for classifying audio data is to use an audio classifier. A typical audio classifier seeks to classify a portion of input audio data as having a particular label. Conventional audio classifiers are typically trained based on a collection of human annotated training data.

SUMMARY

In general, one innovative aspect of the subject matter described in this specification can be embodied in methods that include the actions of obtaining a plurality of video frames from a plurality of videos, wherein each of the plurality of video frames is associated with one or more image labels of a plurality of image labels determined based on image recognition; obtaining a plurality of audio segments corresponding to the plurality of video frames, wherein each audio segment has a specified duration relative to the corresponding video frame; and generating an audio classifier trained using the plurality of audio segment and the associated image labels as input, wherein the audio classifier is trained such that the one or more groups of audio segments are determined to be associated with respective one or more audio labels. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method includes scoring each of a collection of video frames from the plurality of videos, wherein the each video frame is scored for one or more of the plurality of image labels; determining a score of the each video frame satisfies a threshold; and selecting the plurality of video frames in response to determining a score of the each video frame satisfies the threshold. The method includes selecting video frames periodically from the plurality of video; and scoring the selected video frames for the image label. The corresponding video frame occurs during the specified duration. The one or more audio labels are determined by using an image classifier. The method includes identifying an object on video frames from the plurality of videos; and determining the image label associated with the object. The method includes evaluating the audio classifier using sample videos having known an audio label for the sample videos.

In general, one innovative aspect of the subject matter described in this specification can be embodied in methods that include the actions of receiving a query, the query including one or more query terms; using the one or more query terms to identify one or more audio resources responsive to the query, wherein each audio resource is associated with one or more audio labels generated by an audio classifier trained using audio segments extracted from video content and corresponding image labels identified from the video content; and providing search results identifying the one or more audio resources. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages. A conventional audio classifier obtains annotated audio data by manual annotation of the data. Since the conventional audio classifier requires manual annotation, it is cost-ineffective and time-consuming. Compared to the conventional audio classifier, an audio classifier can obtain unannotated audio data from video content. Thus, the audio classifier can be trained using any suitable videos without need for manual annotation of the audio data. In particular, labels generated by an image classifier can be used as supervision for training the audio classifier to exploit a correlation between audio and video modalities. The audio classifier is trained using image labels identified from image detection systems that are more sophisticated than conventional automated audio annotation systems, consequently, the audio classifier can be quickly trained using a large amount of audio data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Audio classifiers assign one or more audio labels to input audio data. Different types of audio data may be classified including speech, music, natural sounds such as rain and wind, human emotions such as crying and laughter, animal vocalization such as roaring and purring, or other artifact sound such as explosions, racing cars and telephone ringers. Machine learning can be used to train an audio classifier designed to perform a particular classification. Image content in videos can be highly correlated with associated audio content. Using this correlation, an audio classifier can be trained using audio data extracted from videos and associated image labels such that the trained audio classifier can assign one or more audio labels to input audio data.

The trained audio classifier can be used for various applications. For example, to provide search results, responsive to a search query, that specifically identify audio files either alone or in addition to general search results. In particular, the audio files can be identified based on the audio labels associated with the audio files, which allows audio content to be returned accurately in response to a search query even.

Figure 1:
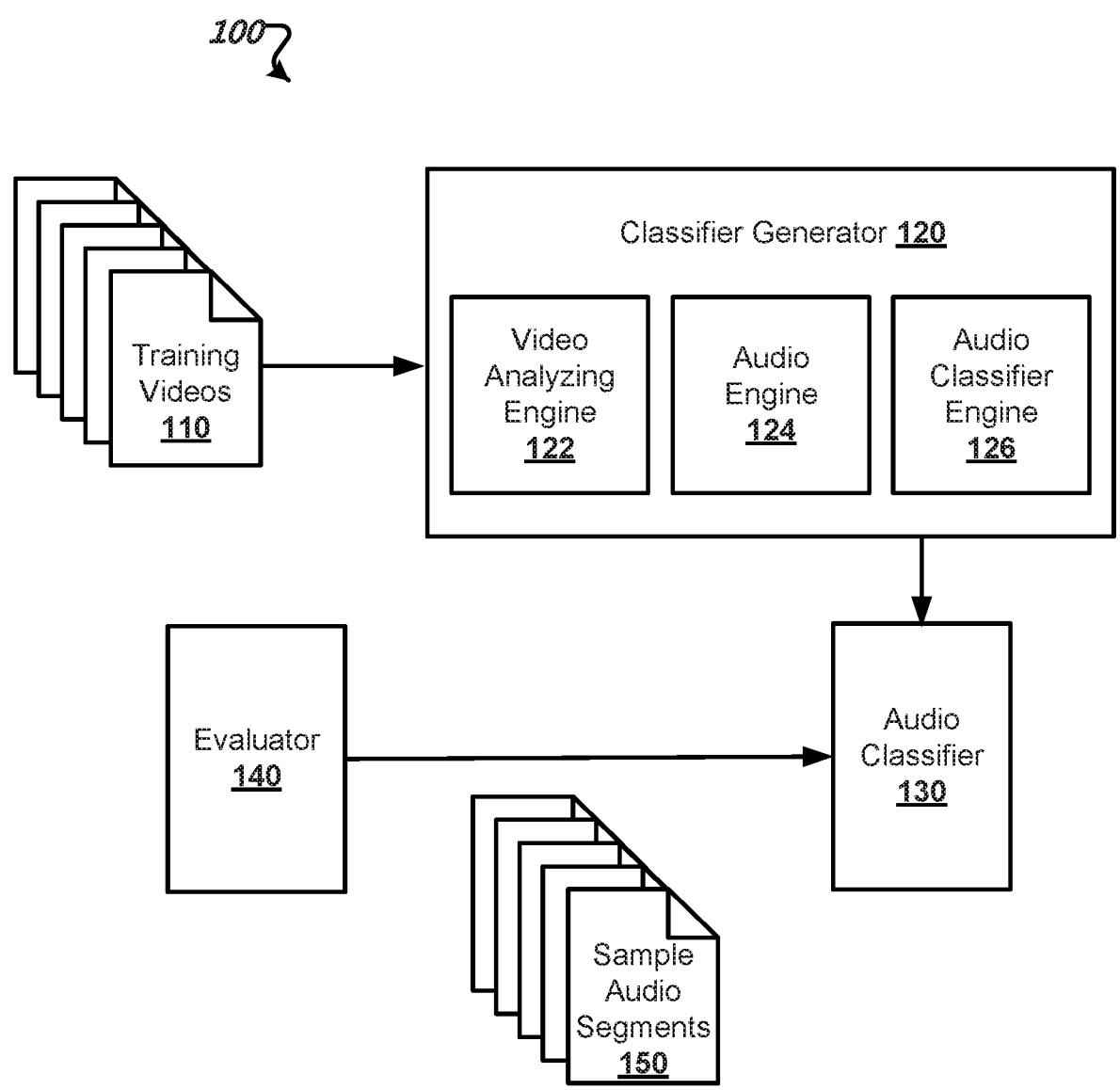
FIG. 1 is a diagram of an example system for generating an audio classifier

FIG. 1 is a diagram of an example system for generating an audio classifier. The system 100 includes an audio classifier generator 120 that receives a collection of training videos 110 and uses the training videos 110 to generate an audio classifier 130. The system 100 also includes an evaluator 140 to validate the accuracy of the audio classifier 130. Each of the training videos include multiple video frames. For example, a video file, when played, presents a consecutive frames at a specified rate, e.g., 30 video frames per second.

The audio classifier generator 120 includes a video analyzing engine 122, an audio engine 124, and an audio classifier engine 126. The video analyzing engine 122 analyzes the training videos 110 to extract a collection of video frames. Each of the extracted video frames can be associated with an image label determined based, for example, on an image recognition process, which may broadly include image content analysis to identify particular image content corresponding to one or more labels.

In some implementations, the video analyzing engine 122 annotates the video frames of the training videos 110 with one or more image labels according to a suitable image recognition technique. In some other implementations, the video analyzing engine 122 receives annotated videos that have been annotated with image labels by a suitable image recognition system.

To annotate the video frames of the training videos 110, the video analyzing engine 122 may associate the video frames with one or more image labels. In some implementations, if the annotated video frames include a specific object or objects, the video analyzing engine 122 can associate the video frames having the specific object or objects with one or more image labels describing the specific object or objects. For example, if the annotated video frames include a birthday cake or a candle, the video analyzing engine 122 can associate the video frames with one or more image labels such as "birthday cake," "birthday," "cake," or "candle." Thus, the video analyzing engine 122 can obtain, from the training videos 110, a collection of video frames associated with an image label. Examples of obtaining video frames from videos are described in greater detail below.

The audio engine 124 obtains a group of audio segments corresponding to the video frames. After the video analyzing engine 122 obtains a group of video frames from the training videos 110, the audio engine 124 obtains audio segments corresponding to the obtained video frames. Since the obtained video frames are associated with the image label, the audio segments corresponding to the obtained video frames can also be associated with the image label. In some implementations, each audio segment has a specified duration relative to the corresponding video frame. Examples of obtaining audio segments corresponding to video frames are described in greater detail below with FIG. 2.

Once the audio engine 124 obtains the audio segments and the associated image labels, the audio classifier engine 126 generates and trains the audio classifier 130 using the obtained audio segments and the associated image labels as input. The audio classifier 130 is trained to associate one or more groups of audio segments with respective one or more audio labels. After the audio classifier is trained, the audio classifier 130 can associate one or more groups of audio segments with respective audio labels.

In some implementations, the system can process the image labels to associate the audio segments with the audio labels. The system may derive audio labels from the image labels assigned by the image recognition technique. For example, if the system obtains the image label "birthday," the system may generate audio labels such as "birthday song" and "applause," which can be relevant to the image label "birthday." The system then associates the image label "birthday" with the audio labels "birthday song" and "applause" by mapping the image label into the audio labels. Thus, the audio segments associated with the image label "birthday" can be associated with the audio labels "birthday song" and "applause." Examples of training the audio classifier are described in greater detail below.

Once the audio classifier 130 is generated, the evaluator 140 can evaluate the audio classifier using a group of sample audio segments 150 having known associations with respective audio labels, for example, from manual annotation by human evaluators. Examples of evaluating the audio classifier are described in greater detail below.

Examples of Selecting Annotated Video Frames

After the image recognition associates video frames with image labels, the video analyzing engine 122 scores the recognized video frames. The video analyzing engine 122 can score each of the recognized video frames with respect to one or more identified image labels. In some implementations, the score indicates a confidence that a video frame is associated with a particular image label. The video analyzing engine 122 can score a video frame based on various criteria including color, shape, or texture of the object in the video frame.

The video analyzing engine 122 determines whether a score of each video frame satisfies a threshold. The video analyzing engine 122 can compare the scores of the recognized video frames to the threshold. As noted above, the score indicates the confidence that a video frame is associated with a particular image label. If a score of a video frame satisfies the threshold, e.g., the score exceeds a threshold score value, the video analyzing engine 122 can determine that the video frame is associated with a particular image label. If a score of a video frame does not satisfy the threshold, the video analyzing engine 122 can determine that the video frame is not associated with a particular image label.

The video analyzing engine 122 selects a group of video frames in response to determining the scores of the recognized video frames satisfy the threshold score. If the video analyzing engine 122 determines that the score of the recognized video frame satisfies the threshold, the video analyzing engine 122 selects the video frame. Then, the video analyzing engine 122 continues to obtain an audio segment for the video frame. For example, if the score of a video frame associated with the image label "birthday" satisfies the threshold, the video analyzing engine 122 selects the video frame. If the video analyzing engine 122 determines that the score of a video frame does not satisfy the threshold, the video analyzing engine 122 does not select the video frame.

Examples of Obtaining Audio Segments Corresponding to Selected Video Frames

Figure 2A:
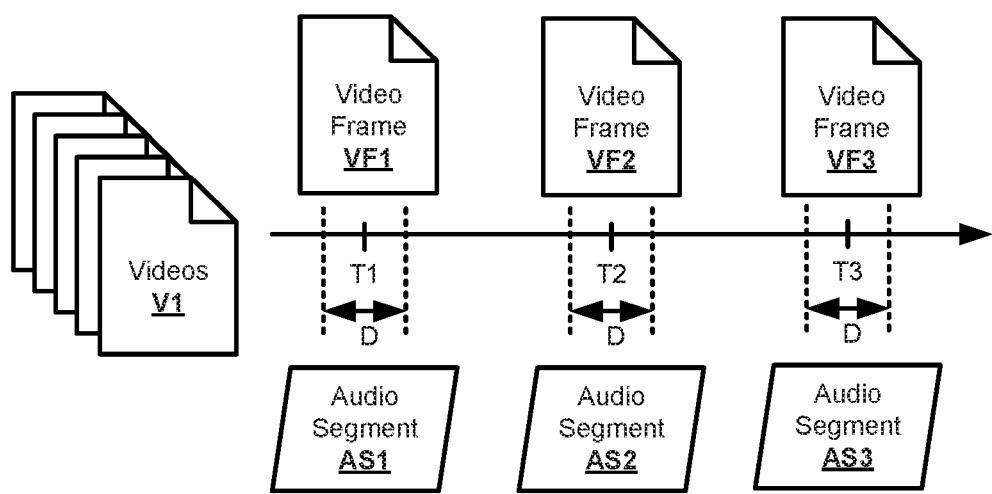
FIGS. 2A-2C are diagrams illustrating examples of obtaining audio segments corresponding to video frames.
Figure 2B:
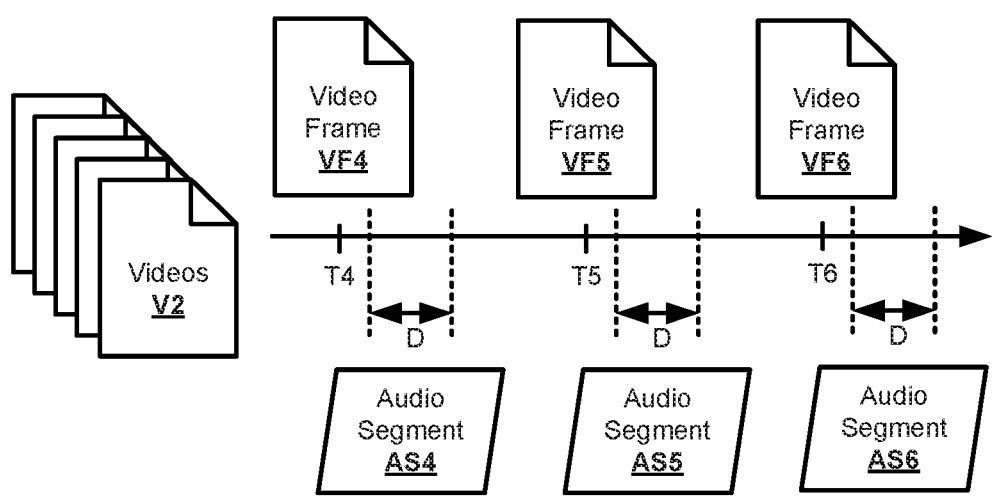
Figure 2C:
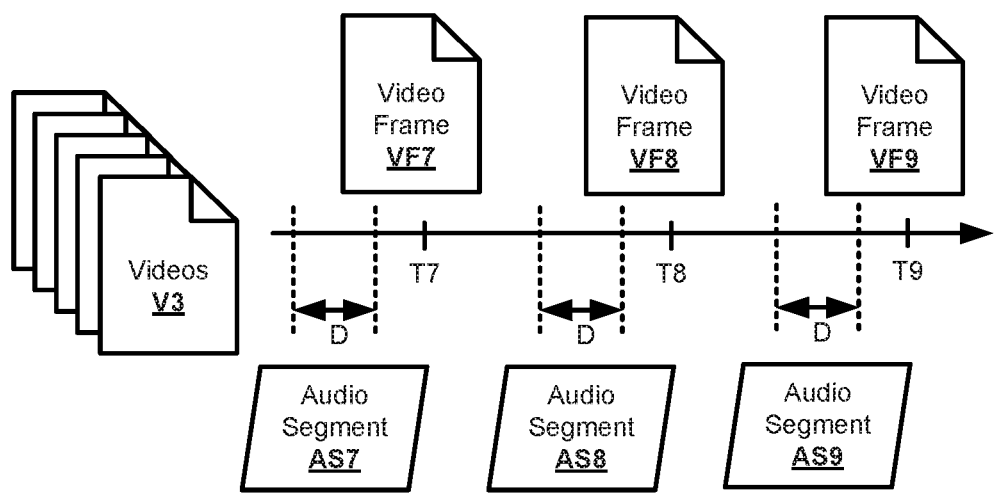

FIGS. 2A-2C show diagrams illustrating examples of obtaining audio segments corresponding to the selected video frames. The audio segments are audio data included in the videos. The audio data may include speech, music, natural sounds such as rain and wind, human emotions such as crying and laughter, animal vocalization such as roaring and purring, or other audio concepts such as explosions, racing cars and telephone ringers.

For example, the video analyzing engine 122 may select the video frames VF1~9 associated with the image label "birthday" from a multiple sets of videos V1~3. From the multiple sets of videos V1~3, the video analyzing engine 122 obtains audio segments AS1~9 corresponding to the video frames VF1~9. The audio segments AS1~9 are audio data included in the multiple sets of videos V1-V3. The audio data may include sounds corresponding to, for example, human emotions such as laughter, sounds of applause to celebrate, or sounds of singing a birthday song. The duration of the audio segments can be specified according to one or more criteria, for example, a duration likely to provide audio correlated to the image recognized in the video frame. In some implementations, the duration of each audio segment is one second. In some other implementations, the duration of each audio segment can be more or less than one second.

The audio segments AS1~9 may have a specified duration D relative to the corresponding video frames VF1~9. The video analyzing engine 122 can obtain the audio segments AS1~9 relative to the corresponding video frames VF1~9 in various ways.

In some implementations, as shown in FIG. 2A, the video analyzing engine 122 may obtain the audio segments AS1~3 from a video of a first set of videos V1. The video analyzing engine 122 may obtain the audio segments AS1~3 such that each of the video frames VF1~3 occurs during each specified duration of the audio segments AS1~3. For example, where the video frame VF1 occurs at the time T1, the time T1 occurs during the specified duration D of the audio segment AS1. The video analyzing engine 122 obtains the audio segment AS1 having the specified duration relative to the video frame VF1. For example, the audio segment AS1 can have a midpoint corresponding to the time T1. The video analyzing engine 122 may obtain additional audio segments from other videos of the first set of videos V1 such that each of video frames occurs during each specified duration of the additional audio segments.

In some other implementations, as shown in FIG. 2B, the video analyzing engine 122 may obtain the audio segments AS4~6 from a video of a second set of videos V2. The video analyzing engine 122 may obtain the audio segments AS4~6 such that each of the video frames VF4~6 occurs during each specified duration of the audio segments AS4~6. For example, where the video frame VF4 occurs at the time T4, the time T4 occurs before the specified duration D of the audio segment AS4. The video analyzing engine 122 obtains the audio segment AS4 having the specified duration relative to the video frame VF4. For example, the audio segment AS4 can have a beginning point just after the time T4. The video analyzing engine 122 may obtain additional audio segments from other videos of the second set of videos V2 such that each of video frames occurs during each specified duration of the additional audio segments.

In some other implementations, as shown in FIG. 2C, the video analyzing engine 122 may obtain the audio segments AS4~6 from a video of a second set of videos V2. The video analyzing engine 122 may obtain the audio segments AS7~9 such that each of the video frames VF7~9 occurs during each specified duration of the audio segments AS7~9. For example, where the video frame VF7 occurs at the time T7, the time T7 occurs after the specified duration D of the audio segment AS7. The video analyzing engine 122 obtains the audio segment AS7 having the specified duration relative to the video frame VF7. For example, the audio segment AS7 can have an end point just before the time T7. The video analyzing engine 122 may obtain additional audio segments from other videos of the second set of videos V2 such that each of video frames occurs during each specified duration of the additional audio segments.

Training the Audio Classifier

The audio classifier engine 126 trains the audio classifier 130. The trained audio classifier 130 is a classifier that assigns a score to input audio data for one or more audio labels. If a particular audio label score exceeds a specified threshold, then the input audio data is classified as associated with that label. Any suitable audio classifier model can be used as the audio classifier 130.

The audio classifier 130 is trained using audio segments, e.g., obtained from the audio engine 124 and associated image labels, e.g., obtained from the video analyzing engine 122. In particular, the audio segments form a training set of audio data. The corresponding image labels are used to provide supervision for the training process. The image labels can be associated with one or more audio labels. The training process is performed such that for a given audio segment of the training set of audio data the classifier identifies an audio label associated with the image label associated with the audio segment.

More specifically, the audio classifier is trained based on a number of features extracted from the audio segments. The features can be acoustic features identified, for example, from an auditory image. The auditory image can be generated, for example, from a particular acoustic model e.g., a cochlear model. The audio classifier is trained using the extracted features as variables. The training process determines optimum weights for the respective features that maximize the likelihood of correctly classifying an input audio segment as having an audio label associated with a corresponding image label for the input audio segment.

The audio classifier 130 assigns a score to each audio segment for a particular audio label. The score indicates the likelihood that an audio segment is associated with a particular audio label. If an audio classifier 130 assigns a high score to the audio segment for a particular audio label, the audio segment is strongly associated with the particular audio label. If an audio classifier 130 assigns a low score to the audio segment for a particular audio label, the audio segment is weakly associated with a particular audio label. For example, as noted above, where the image label is "birthday," the video analyzing engine 122 may obtain the audio labels "birthday song" and "applause." If an audio segment includes sound of singing a birthday song or sound of applause, the audio classifier 130 can assign a high score to the audio segment. In contrast, if an audio segment includes sound of a lecture about birthday cake baking, the audio classifier 130 can assign a low score to the audio segment. In some implementations, different techniques or combinations of techniques can be used to assign scores to the group of audio segments for the audio label.

If necessary, the classifier generator 120 can perform additional iterations to train the audio classifier 130. The audio classifier 130 can repeat the process of assigning scores to each audio segment.

After additional iterations, the classifier generator 120 generates the trained audio classifier 130. The system 100 may store the scores to the one or more groups of audio segments for the respective one or more audio labels.

Examples of Evaluating an Audio Classifier

In some implementations, once the audio classifier 130 is trained, the evaluator 140 can evaluate the trained audio classifier 130 using a group of sample audio segments 150 having known associations with respective sample audio labels. The sample audio segments 150 are distinct from the audio segments used for training the audio classifier 130.

The trained audio classifier 130 can classify each sample audio segment with particular audio labels. The classification of the sample audio segments with the respective audio labels can be evaluated based on the known association between the sample audio segments and the respective sample audio labels. As a result, the evaluator can evaluate the accuracy of the audio classifier 130. If the output association of the audio classifier 130 does not substantially match the known association, the audio classifier 130 can be adjusted or trained on a new set of training audio segments and associated image labels. If the output association of the audio classifier 130 substantially matches the known association, the audio classifier 130 can be applied to a larger group of audio segments to associate audio segments with respective audio labels. In some implementations, the trained audio classifier 130 can be evaluated by using suitable metrics of audio similarity.

Once the trained audio classifier 130 is evaluated, the trained audio classifier 130 can be used to process audio data so as to associate the audio data audio labels. The audio data can be obtained as stand-alone audio data or audio data as part of other content, e.g., extracted from video data. In some implementations, the audio data classified with the audio labels can be provided to a search system. For example, a user can search a particular sound based on one or more audio labels.

Figure 3:
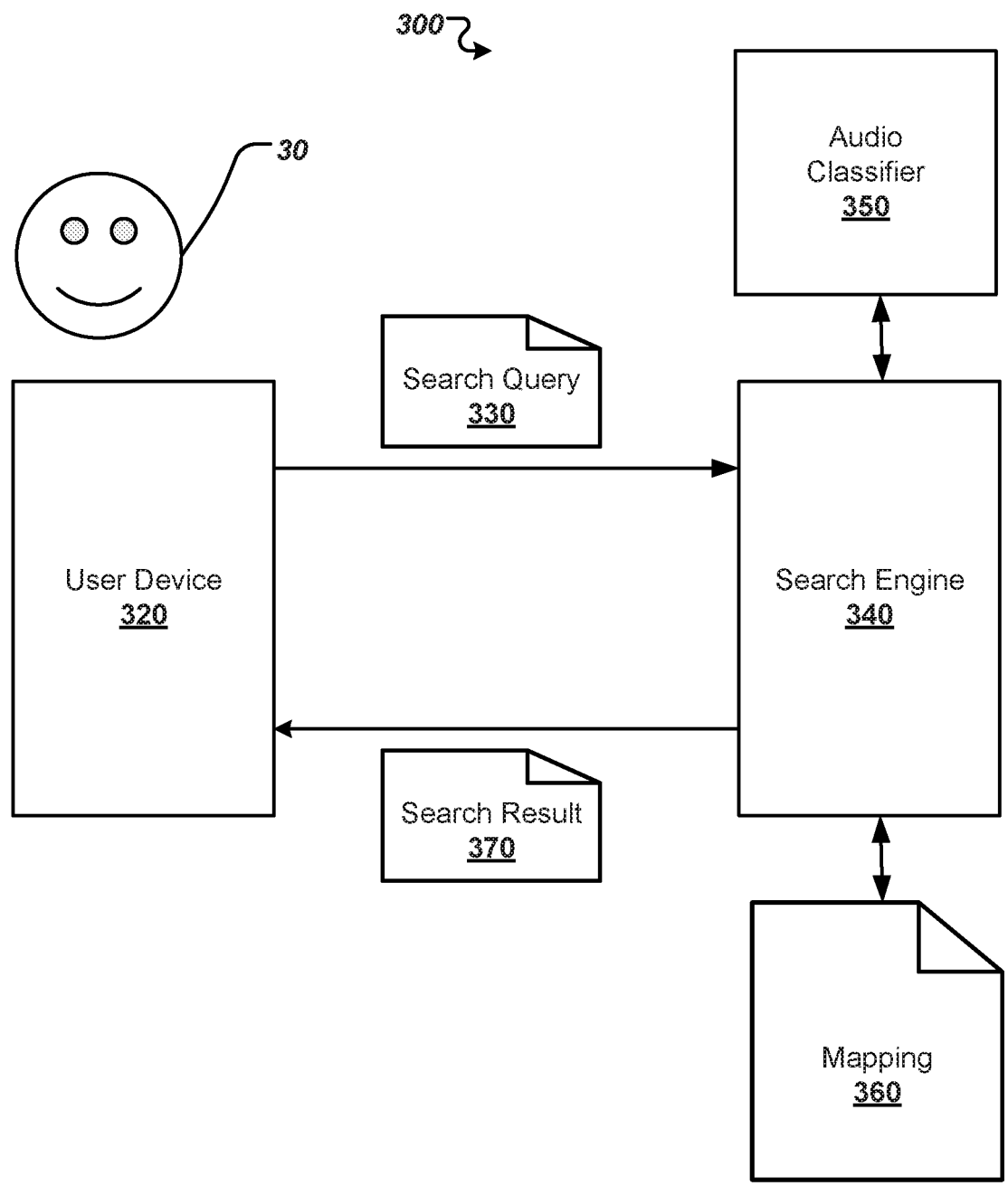
FIG. 3 is a diagram of an example search system.

FIG. 3 is a diagram of an example search system 300. The search system 300 is configured to provide search results 370 in response to a received search query 330. The search system 300 includes one or more computers programmed to receive the search query 330 from a user device 320, retrieve a mapping 360 that relates keywords and audio labels, identify one or more keywords from one or more query terms, identify one or more audio segments responsive to the search query 330, and provide the search results 370 identifying the audio segments. The search system 300 can be implemented, for example, on one or more computers including a server or on a user device.

The search engine 340 receives the search query 330 for audio content. In some implementations, the search engine 340 receives a query from the user device 320. For example, a user 30 can input 330 search query to a search interface provided by the user device 320. The received query includes one or more query terms. For example, the received query is "what is the most famous birthday song."

The search engine 340 identifies resources that are responsive to the search query 330. For example, the search engine 340 can use an index engine that indexes resource, e.g., web pages, images, and audio data, and a ranking engine to rank the resources that match the search query 340. The indexing and ranking of the resources can be performed using conventional techniques. The index can include index information for audio resources according to the associated audio labels.

In some implementations, the search engine 340 uses the terms of the search query 330 to identify audio resources responsive to the search query. For example, the search engine 340 can match the query terms to the audio labels of the index. Matching audio labels can be ranked according to the ranking engine. One or more search results identifying audio data based on the ranking can be determined. For example, the search engine 340 can match the query terms "birthday" and "song" to the audio label "birthday song." Then, the search engine 340 identifies the audio label "birthday song" responsive to the search query 330. Based on the identified audio label "birthday song," the search engine 340 identifies the audio data resources associated with the audio label "birthday song."

The search engine 340 provides the search results 370, which can include search results for one or more audio resources. The search results 370 can be presented as one or more ranked hyperlinks directed to resources corresponding to the audio segments having the audio content responsive to the search query 330. In some implementations, the hyperlinks are directed to specific portions of video resources that include the audio content. For example, in response to the query "what is the most famous birthday song," the search engine 340 can provide the hyperlinks directed to specific portions of videos and a birthday song is played during the specific portions of videos.

Figure 4:
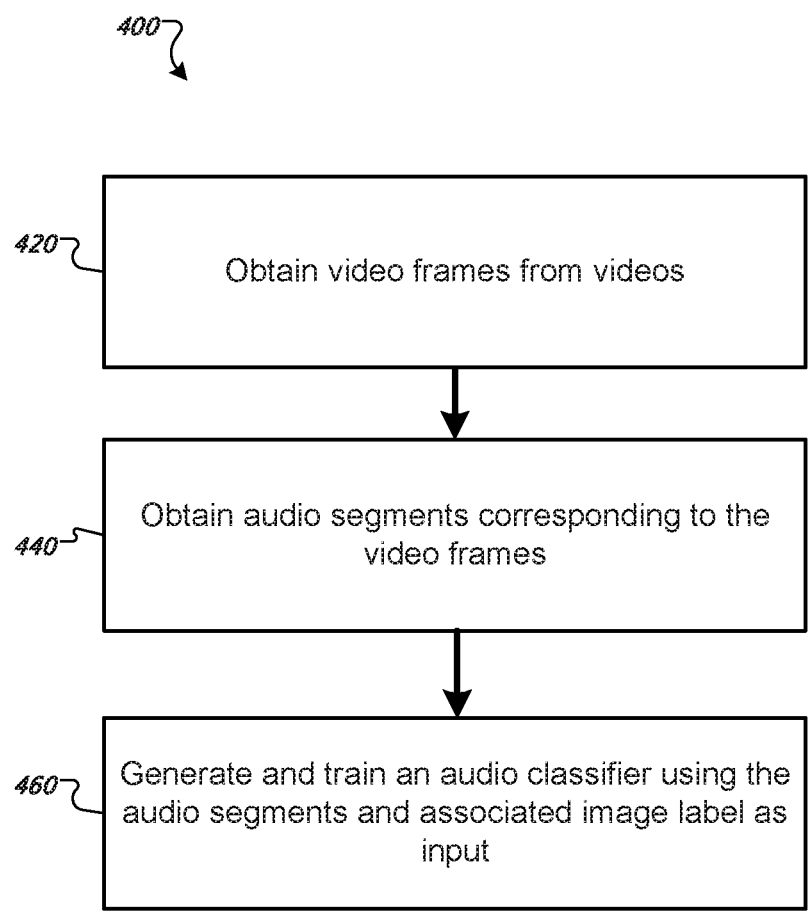
FIG. 4 is a flowchart of an example method for generating an audio classifier.

FIG. 4 is a flowchart of an example method 400 for generating an audio classifier. For convenience, the method 400 is described with respect to a system that performs the method 400. The system may include one or more computers.

The system obtains 420 a group of video frames from a group of videos. Each of the video frames is associated with an image label determined based on image recognition. The system may receive a collection of training video files. Each video file can include multiple video frames. The system annotates the video frames from the video files according to a suitable image recognition technique. The system may associate the video frames with an image label. In some implementations, if the annotated video frames include a specific object or objects, the system can associate the video frames having the specific object or objects with the image label describing the specific object or objects. For example, if the annotated video frames include a birthday cake or a candle, the system can associate the video frames with the image label "birthday," "cake," or "candle."

The system obtains 440 a group of audio segments corresponding to the video frames. After the system obtains a group of video frames from the videos, the system obtains audio segments corresponding to the obtained video frames. Since the obtained video frames are associated with the image label, the audio segments corresponding to the obtained video frames can also be associated with the image label. In some implementations, each audio segment has a specified duration relative to the corresponding video frame.

The system generates 460 an audio classifier trained using the audio segments and the associated image label as input. Once the system obtains audio segments and associated image labels, the system generates and trains the audio classifier using the obtained audio segments and the associated image labels as input. The audio classifier is trained to associate one or more groups of audio segments with respective one or more audio labels. After the training, the audio classifier can associate a group of audio segments with an audio label.

Figure 5:
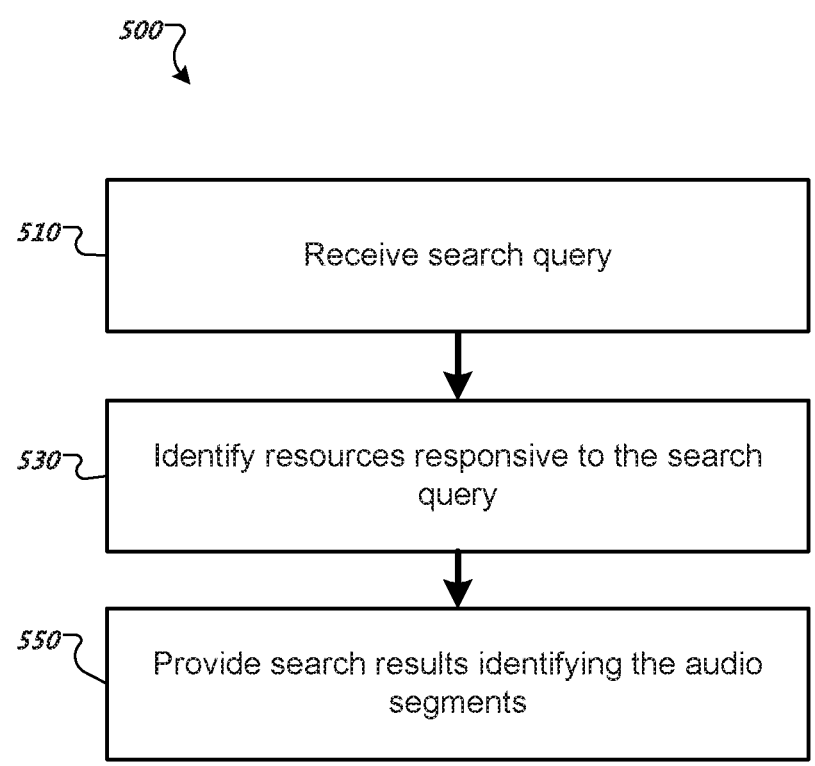
FIG. 5 is a flowchart of an example method for providing search results.

FIG. 5 is a flowchart of an example method 500 for providing search results. For convenience, the method 500 is described as being performed by a system of one or more computers. For example, the system can be a search system configured to provide search results in response to a received query.

The system receives 510 a search query for audio content. In some implementations, the search system receives a query from a user device. For example, a user can input a search query to a search interface provided by the search system. The received search query includes one or more query terms. For example, the received query is "what is the most famous birthday song."

The system identifies 530 resources that are responsive to the search query. For example, the system can index resources, e.g., web pages, images, and audio data, and rank the resources that match the search query. The indexing and ranking of the resources can be performed using conventional techniques. The index can include index information for audio resources according to the associated audio labels.

In some implementations, the system uses the terms of the search query to identify audio resources responsive to the search query. For example, the system can match the query terms to the audio labels of the index. Matching audio labels can be ranked according to the ranking engine. One or more search results identifying audio data based on the ranking can be determined. For example, the system can match the query terms "birthday" and "song" to the audio label "birthday song." Then, the system identifies the audio label "birthday song" responsive to the search query. Based on the identified audio label "birthday song," the system identifies the audio data resources associated with the audio label "birthday song."

The system provides 550 search results, which can include search results for one or more audio resources. The search results can be presented as one or more hyperlinks directed to resources corresponding to the audio segments having the audio content responsive to the search query. In some implementations, the hyperlinks can be directed to specific portions of video resources that include the audio content. For example, in response to the query "what is the most famous birthday song," the system can provide the hyperlinks directed to specific portions of videos and a birthday song is played during the specific portions of videos.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially be claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
    obtaining a plurality of video frames from a plurality of videos;
    generating, for each of the plurality of video frames, one or more image labels of a plurality of image labels based on image recognition and associating the one or more image labels with each of the plurality of video frames;
    obtaining a plurality of unlabeled audio segments corresponding to the plurality of video frames, wherein each unlabeled audio segment has a specified duration relative to the corresponding video frame;
    generating an audio classifier, wherein the audio classifier is trained using the plurality of unlabeled audio segments and the associated image labels from the plurality of video frames as input training data, and wherein the audio classifier is trained to assign one or more audio labels to unlabeled audio segments input to the audio classifier;
    using the audio classifier to label a collection of audio segments; and
    indexing the collection of audio segments including associating the audio labels with corresponding audio segments.

2. The method of claim 1, wherein obtaining the plurality of video frames from the plurality of videos comprising:
    scoring each of a collection of video frames from the plurality of videos, wherein the each video frame is scored for one or more of the plurality of image labels;
    determining a score of the each video frame satisfies a threshold; and
    selecting the plurality of video frames in response to determining a score of the each video frame satisfies the threshold.

3. The method of claim 1, wherein obtaining an unlabeled audio segment corresponding to a video frame includes setting a time of the video frame as a midpoint of a corresponding audio segment of a specified duration, and obtaining the audio segment spanning the specified duration relative to the time of the video frame.

4. The method of claim 1, wherein the corresponding video frame occurs during the specified duration of the corresponding audio segment.

5. The method of claim 1, wherein obtaining a plurality of video frames from a plurality of videos further comprises:
identifying an object on video frames from the plurality of videos; and
determining the image label associated with the object.

6. The method of claim 1, further comprising:
evaluating the audio classifier using sample audio segments having known audio labels.

7. A system comprising:
one or more computers and one or more storage devices storing instructions that are operable, when executed by the one or more computers, to cause the one or more computers to perform operations comprising:
obtaining a plurality of video frames from a plurality of videos;
generating, for each of the plurality of video frames, one or more image labels of a plurality of image labels based on image recognition and associating the one or more image labels with each of the plurality of video frames;
obtaining a plurality of unlabeled audio segments corresponding to the plurality of video frames, wherein each unlabeled audio segment has a specified duration relative to the corresponding video frame;
generating an audio classifier, wherein the audio classifier is trained using the plurality of unlabeled audio segments and the associated image labels from the plurality of video frames as input training data, and wherein the audio classifier is trained to assign one or more audio labels to unlabeled audio segments input to the audio classifier;
using the audio classifier to label a collection of audio segments; and
indexing the collection of audio segments including associating the audio labels with corresponding audio segments.

8. The system of claim 7, wherein obtaining the plurality of video frames from the plurality of videos comprising:
scoring each of a collection of video frames from the plurality of videos, wherein the each video frame is scored for one or more of the plurality of image labels;
determining a score of the each video frame satisfies a threshold; and
selecting the plurality of video frames in response to determining a score of the each video frame satisfies the threshold.

9. The system of claim 7, wherein obtaining an unlabeled audio segment corresponding to a video frame includes setting a time of the video frame as a midpoint of a corresponding audio segment of a specified duration, and obtaining the audio segment spanning the specified duration relative to the time of the video frame.

10. The system of claim 7, wherein the corresponding video frame occurs during the specified duration of the corresponding audio segment.

11. The system of claim 7, wherein obtaining a plurality of video frames from a plurality of videos further comprises:
identifying an object on video frames from the plurality of videos; and
determining the image label associated with the object.

12. The system of claim 7, further comprising instructions that are operable, when executed by the one or more computers, to cause the one or more computers to perform operations comprising:
evaluating the audio classifier using sample audio segments having known audio labels.

13. One or more non-transitory computer storage media encoded with instructions that, when executed by one or more computers, cause the one or more computers to perform operations comprising:
obtaining a plurality of video frames from a plurality of videos;
generating, for each of the plurality of video frames, one or more image labels of a plurality of image labels based on image recognition and associating the one or more image labels with each of the plurality of video frames;
obtaining a plurality of unlabeled audio segments corresponding to the plurality of video frames, wherein each unlabeled audio segment has a specified duration relative to the corresponding video frame;
generating an audio classifier, wherein the audio classifier is trained using the plurality of unlabeled audio segments and the associated image labels from the plurality of video frames as input training data, and wherein the audio classifier is trained to assign one or more audio labels to unlabeled audio segments input to the audio classifier;
using the audio classifier to label a collection of audio segments; and
indexing the collection of audio segments including associating the audio labels with corresponding audio segments.

14. The one or more non-transitory computer storage media of claim 13, wherein obtaining the plurality of video frames from the plurality of videos comprising:
scoring each of a collection of video frames from the plurality of videos, wherein the each video frame is scored for one or more of the plurality of image labels;
determining a score of the each video frame satisfies a threshold; and
selecting the plurality of video frames in response to determining a score of the each video frame satisfies the threshold.

15. The one or more non-transitory computer storage media of claim 13, wherein obtaining an unlabeled audio segment corresponding to a video frame includes setting a time of the video frame as a midpoint of a corresponding audio segment of a specified duration, and obtaining the audio segment spanning the specified duration relative to the time of the video frame.

16. The one or more non-transitory computer storage media of claim 13, wherein the corresponding video frame occurs during the specified duration of the corresponding audio segment.

17. The one or more non-transitory computer storage media of claim 13, wherein obtaining a plurality of video frames from a plurality of videos further comprises:
identifying an object on video frames from the plurality of videos; and
determining the image label associated with the object.

18. The one or more non-transitory computer storage media of claim 13, further comprising instructions that, when executed by one or more computers, cause the one or more computers to perform operations comprising:
   evaluating the audio classifier using sample audio segments having known audio labels.

* * * * *